United States Patent
Kwon et al.

[11] Patent Number: 5,844,381
[45] Date of Patent: Dec. 1, 1998

[54] HORIZONTAL DEFLECTION S-TYPED CORRECTION CIRCUIT

[75] Inventors: Joong-Yeol Kwon, Suwon-si; Hideki Kofune, Suwon-s, both of Rep. of Korea

[73] Assignee: SamSung Electronics Co., Ltd., Suwon, Rep. of Korea

[21] Appl. No.: 769,693

[22] Filed: Dec. 18, 1996

[30] Foreign Application Priority Data

Dec. 18, 1995 [KR] Rep. of Korea ............... 51335/1995

[51] Int. Cl.⁶ .................................................. H01J 29/56
[52] U.S. Cl. ........................................................... 315/371
[58] Field of Search .................................. 315/370, 371, 315/408

[56] References Cited

U.S. PATENT DOCUMENTS 4,645,985  2/1987  Dietz ............................... 315/371

*Primary Examiner*—Theodore M. Blum
*Attorney, Agent, or Firm*—Robert E. Bushnell, Esq.

[57] ABSTRACT

A horizontal deflection S-type correction circuit a transformer connected in series to a S-typed correction capacitor that is serially coupled to a horizontal coil of a deflecting yoke and a resistor for detecting deflection current. The resistor is coupled in series with the secondary winding of a first part of the transformer. A differential amplifier is coupled to the primary winding of a second part of the transformer and a double balanced modulator is connected between the resistor and the differential amplifier.

25 Claims, 4 Drawing Sheets

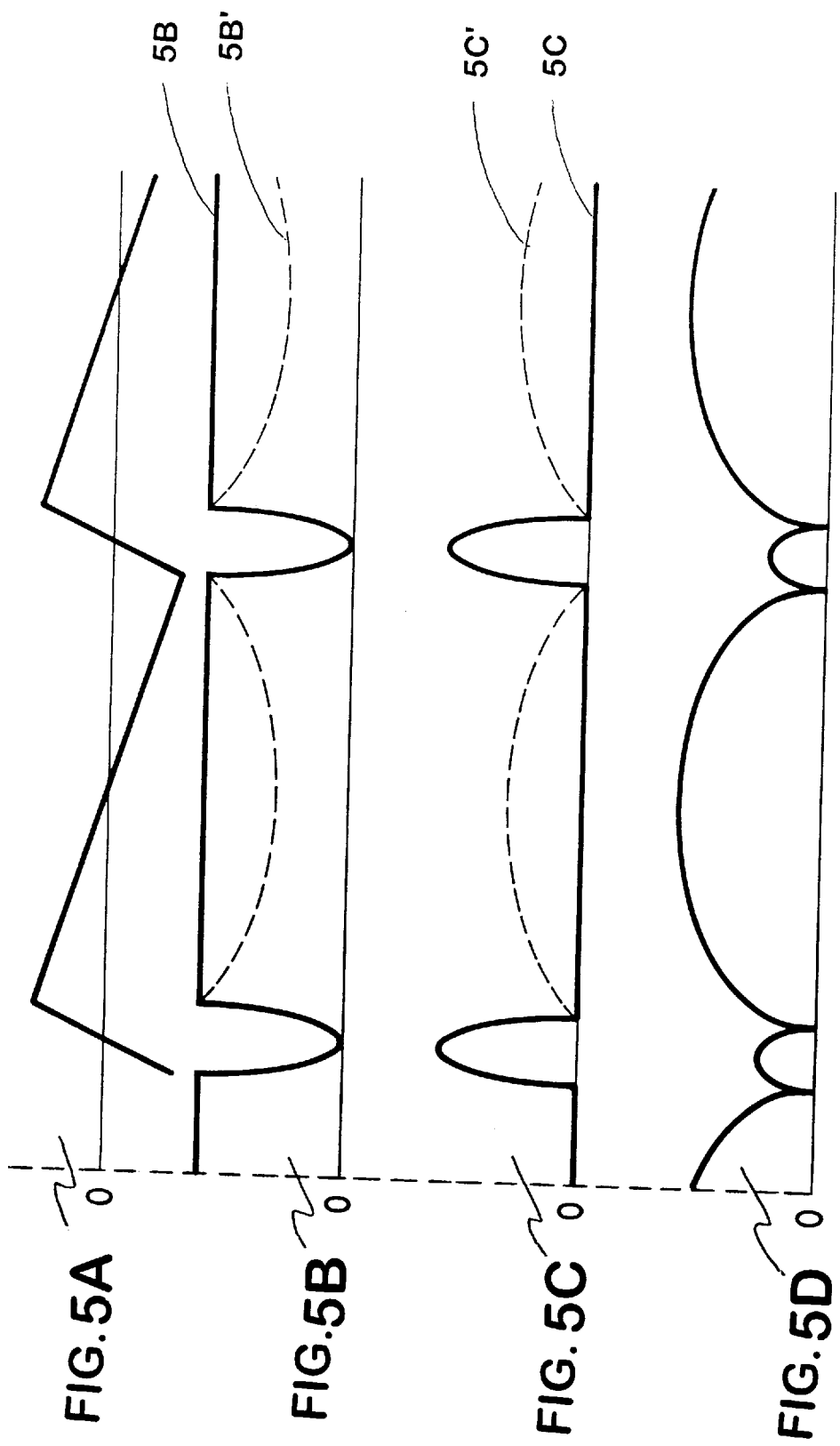

HORIZONTAL DEFLECTION S-TYPED CORRECTION CIRCUIT

CLAIM OF PRIORITY

This application makes reference to, incorporates the same herein, and claims all benefits accruing under 35 U.S.C §119 from an application Entitled *Horizontal Deflection S-typed Correction Circuit* earlier filed in the Korean Industrial Property Office on 18 Dec. 1996, and there duly assigned Ser. No. 51335/1995 by that Office.

BACKGROUND OF THE INVENTION

1. Field of the Invention

The present invention relates to a horizontal deflection S-type correction circuits generally, and more particulary, to horizontal deflection S-type correction circuits providing optimal correction through consecutive correction operations by changing a voltage applied to both terminals of a S-type correction capacitor connected in series to a horizontal coil of a deflecting yoke in accordance with changes in deflecting frequency.

2. Discussion of Related Art

In general, the surface of a cathode ray tube (hereinafter, called it CRT) is almost flat, not parabolic. Thus, if deflection is executed in the CRT at equivalent accelerated velocity, the moving speed of the beam spot is increased more within its peripheral area than in its central area and the deflection is toward outer parts of the left and right sides of the CRT. That is, distortion of an image may arise in a monitor in a S-type form. In order to prevent such distortion, the horizontal deflection correction circuit connects the deflecting coil to the capacitor in series. Further, if the horizontal deflection correction circuit selects resonance frequency between capability of the serial connected capacitor and coil inductance at by ⅓~¼ of the scan frequency, a proper correction wave is obtained. In this circuit the capacitor performs a function of isolating the deflecting coil from direct current.

S-type horizontal deflection circuits used in current practice in the art have a deflecting current exhibiting a sawtoothed waveform flowing into a deflecting coil so that a voltage Es with a parabolic waveform generated in the deflecting coil by integrating the sawtooth waveform signal through a S-type correction capacitor. The voltage Es is generated in series in the deflecting coil and is used to offset the deflection electromotive force and reduce deflection angular velocity at peripheral areas of a screen. If the deflection period is changed, the deflection electromotive force should be increased to keep the amplitude of the deflecting current constant. This means that the width of the deflection is constant. We have found that in an effort to minimize a correction storage phenomenon, it is necessary to either increase or reduce the capacitance of the S-type correction capacitor in proportion to the deflection period, typically by using a plurality of parallel coupled correction capacitors that are switched into and out of the correction circuit. We have found however, that it is difficult to properly correct the deflection frequency by using parallel coupled correction capacitors.

SUMMARY OF THE INVENTION

It is therefore, one object of the present invention to provide an improved horizontal deflection correction circuit.

It is another object to provide a horizontal deflection S-type correction circuit and process able to accomplish optimal correction through consecutive correction operations by changing a voltage applied to both terminals of a S-type correction capacitor connected in series to the horizontal coil of a deflection yoke in accordance with changes in deflection frequency.

To achieve these and other objects in accordance with the principles of the present invention, as embodied and broadly described, the horizontal deflection S-type correction circuit may be constructed with a transformer connected in series to a S-type correction capacitor serially coupled with a horizontal coil of a deflecting yoke and a resistor for detecting deflection current coupled in series with one coil of the transformer. A differential amplifier is coupled to the coil of a second part of the transformer; and a modulator is connected between the resistor and the differential amplifier.

It is to be understood that both the foregoing general description and the following detailed description are exemplary and explanatory and are intended to provide further explanation of the invention as claimed.

BRIEF DESCRIPTION OF THE ATTACHED DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein:

FIG. 3 is a circuit diagram of a modification of a horizontal deflection S-type correction circuit using a plurality of discrete capacitors;

FIGS. 5A–5D are diagrams a diagram illustrating the waveforms of signals occurring at each of elements shown in FIG. 4.

DETAILED DESCRIPTION OF PREFERRED EMBODIMENT

Figure 1:
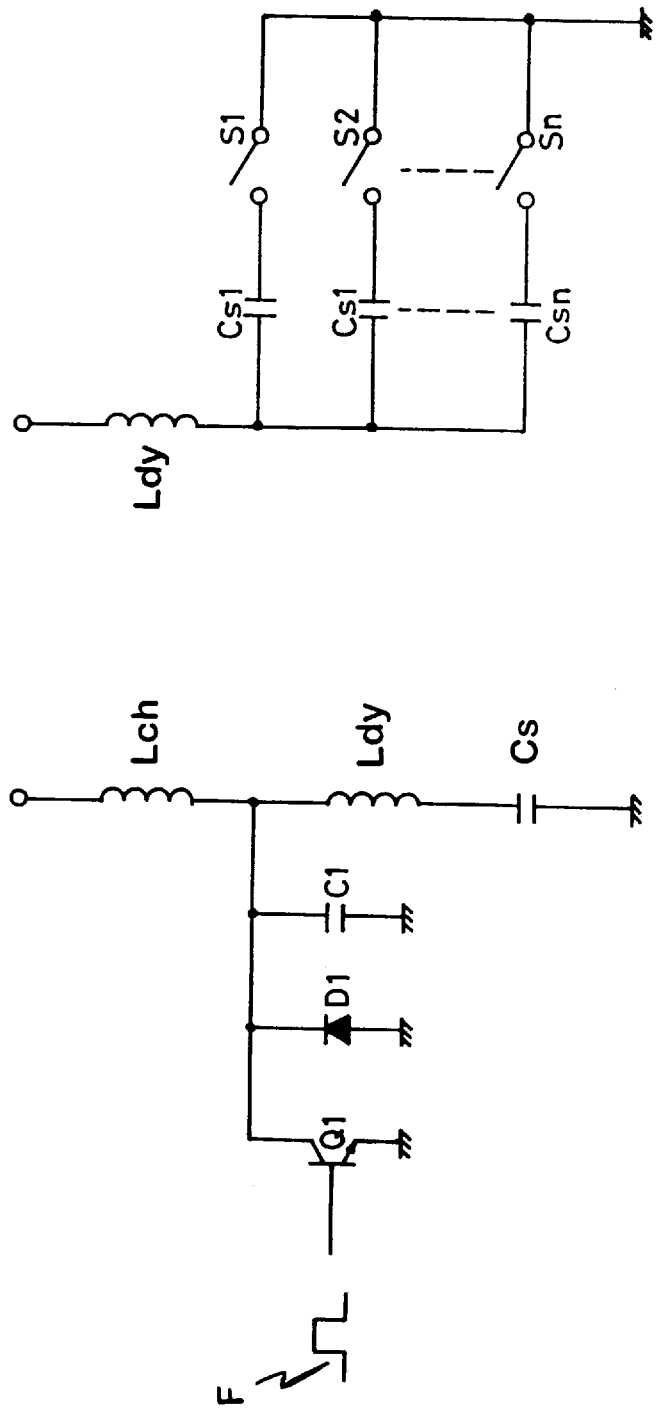
FIG. 1 is a circuit diagram of a typical horizontal deflection S-type correction circuit commonly used in the art.

Turning now to the drawings, FIG. 1 is a circuit diagram of a typical horizontal deflection S-type correction circuit representative of the type frequently used in the art. This horizontal deflection S-type correction circuit has a horizontal output transistor Q1 with a terminal receiving a signal shown as a trace F from a horizontal drive terminal (not shown) and an emitter terminal coupled to the ground voltage, a diode D1 for damping connected in parallel to a collector terminal of horizontal output transistor Q1, a resonance capacitor C1, deflecting coil $L_{DY}$, and a S-type correction capacitor Cs connected in series to the deflecting coil $L_{DY}$.

Figure 2:
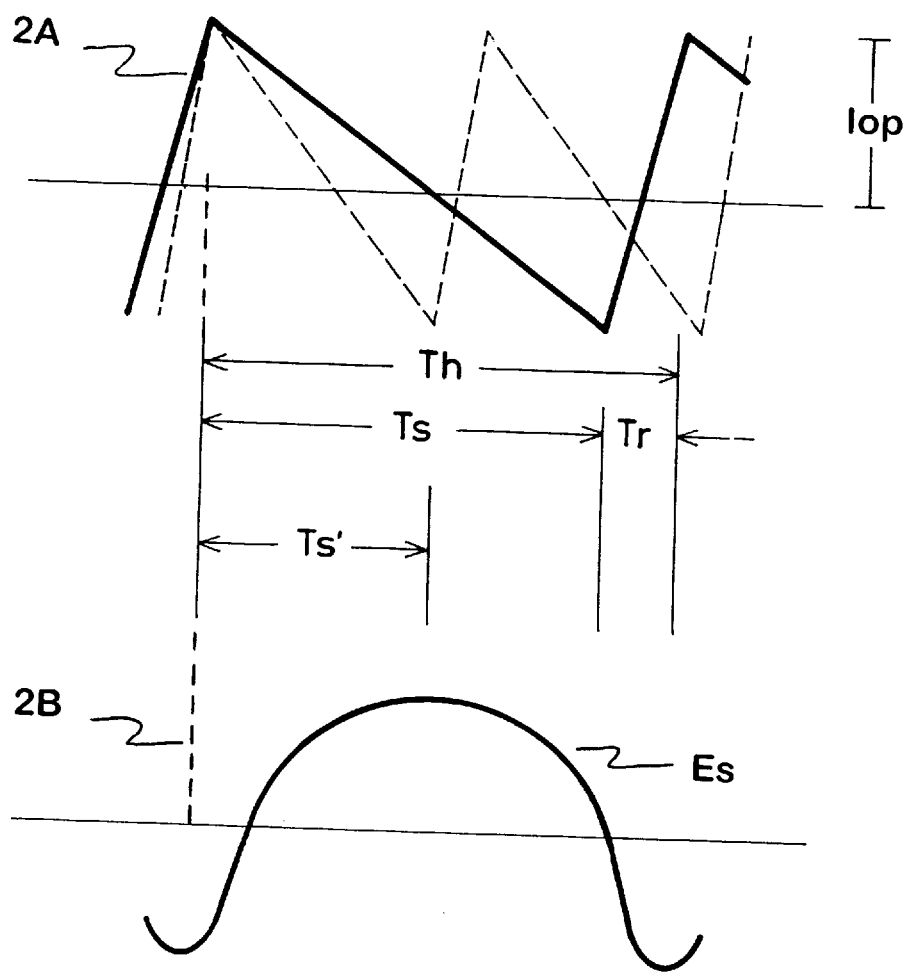
FIGS. 2A and 2B show a waveform illustrating operation of the circuit shown in FIG. 1.

Referring now to FIGS. 1 and 2, the operation of this S-type correction circuit begins first, with a deflecting current flowing into the deflecting coil $L_{DY}$ is shown as a sawtooth waveform 2A and a voltage Es of a parabolic waveform is generated across deflecting coil $L_{DY}$ by integrating a sawtooth waveform signal 2A through the S-type correction capacitor $C_S$. The voltage Es of the parabolic waveform is used to possibly make correction by offsetting the deflection electromotive force and thereby reducing the angular velocity of the deflection at peripheral areas of a screen, since it is generated in series in the deflecting coil. If the deflection period is changed, the deflection electromotive force should be increased to maintain the amplitude of the deflecting current constant. This means that the width of the deflection is kept constant. Therefore, the relationship therebetween is shown as equations (1) and (2) and waveforms 2A, 2B in FIG. 2. waveform 2A is a sawtooth waveform illustrating the deflecting current and waveform 2B shows a parabolic voltage generated when the S-type correction capacitor integrates the deflecting current.

$$E_B = \frac{I_{OP} \cdot L_{DY}}{T_S} \quad (1)$$

and $$E_{SP-P} = \frac{2I_{OP}}{C_S} \quad (2)$$

and
where $E_B$ represents electromotive force (power supply voltage) and $E_{SP-P}$ represents the amplitude of the Es. Since the $I_{OP}$ is constant, $E_{SP-P}$ is also constant and the $E_B$, i.e. $E_{SP-P/EB}$, is reduced in proportion to the reduction of the period of the negative slope $T_S$, thereby causing the correction storage phenomeon. In order to solve the correction storage phenomenon, efforts have been made to reduce the value of the correction capacitor C1. In otherwords, it should be necessary to increase or reduce the S-type correction capacitor in proportion to the deflection period so as to be shown like an equation (3).

$$\frac{E_{SP-P}}{E_B} = \frac{2}{L_{DY}} \times \frac{T_S}{C_S} = A\text{constant} \quad (3)$$

Therefore, as shown in FIG. 3, a plurality of correction capacitors are connected in parallel and the correction of the period of the deflection frequency is changed according to an on/off operation performed by using a machine or electronic switches $S_1 \ldots S_N$.

We have discovered however, that with S-type correction circuit it is difficult to properly correct the signal for the deflection frequency which is not included in the category of capability of the correction capacitor CS.

Figure 4:
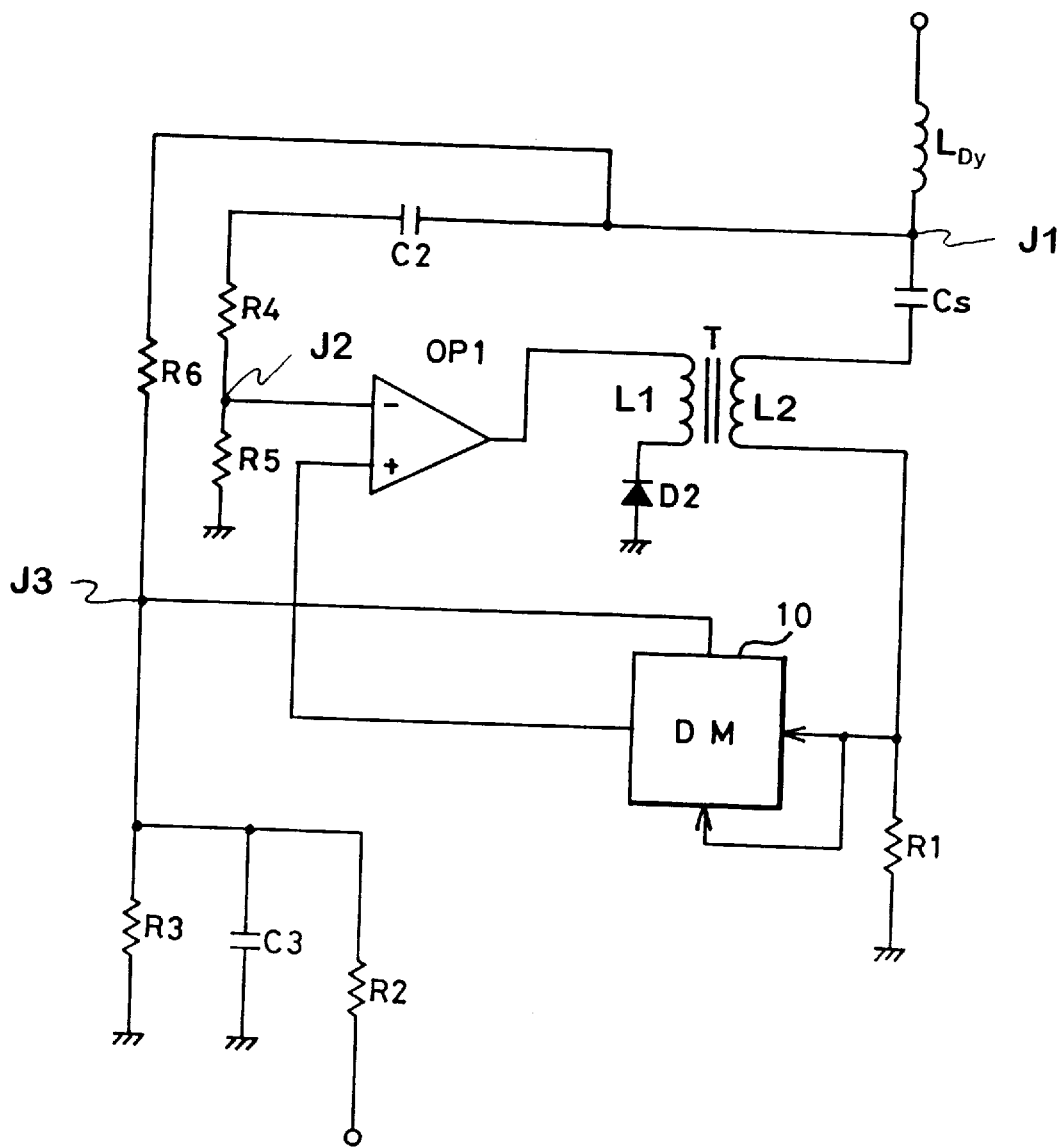
FIG. 4 is a circuit diagram of a horizontal deflection S-typed correction circuit constructed according to the principles of the present invention.

Reference will now be made in detail to the preferred embodiments of the present invention, examples of which are illustrated in the accompanying drawings. FIG. 4 is a circuit diagram of a horizontal deflection S-typed correction circuit constructed according to the principles of the present invention.

This horizontal deflection S-type correction circuit uses a S-type correction capacitor CS connected to a deflecting coil $L_{DY}$, a transformer T coupled in series with the deflection S-type correction capacitor Cs, a resistor R1 for detection of deflecting current connected in series to a coil L2 of the first part (e.g., the secondary winding) of transformer T, a differential amplifier OP1 having an output port connected to one lead of a coil L1 of the second part (e.g., the primary winding) of the transformer T, and a double balanced modulator 10 connected between resistor R1 and a noninverting (+) input port of differential amplifier OP1. Capacitor C2 and resistor R4 are coupled in series between the inverting (−) input port terminal of differential amplifier OP1 and the junction J1 between deflecting coil $L_{DY}$ and deflection S-type correction capacitor Cs, and a resistor R5 (used as a voltage divider with resistor R4) is coupled to resistor R4 at the junction J2 between the inverting terminal of differential amplifier OP1 and a local reference potential such as a local circuit ground. Diode D2 serving as a clamp, is coupled in series with coil L1 of the second part of transformer T. It is proper for impedance of the first part of the transformer T to be given as any one value between $$\frac{1}{\sqrt{2}} \sim \frac{1}{3\sqrt{2}}$$

of the impedance of the deflecting yoke. The operation of the present invention is as follows.

The deflecting current flows into the S-type capacitor Cs connected to the deflection coil $L_{DY}$ and the resistor R1 connected to secondary coil L2 of the first part of the transformer T. At the point, a parabolic wave is generated in both terminals of the S-type capacitor CS by integration of the deflection current $I_{OP}$. At the same time, a differential wave due to the deflection current is generated across the second coil L2 of the first part of the transformer T. The signal detected through the resistor R1 is converted into the parabolic wave by means of double balanced modulator 10 and is thus used as a reference voltage for the correction operation.

The reference voltage is applied to a bottom part of the deflection coil and the differential amplifier OP1, the bottom part of the deflection coil $L_{DY}$ is adjusted in value by the resistors R4 and R5.

Diode D2 clamps a voltage across the primary coil L1 of the second part of the transformer T in a direction "−" relative to the reference voltage generated in the above. At this time, the parabolic waveform is generated as shown by the dotted line 5B, in FIG. 5B, in correspondence with the voltage is generated in the clamping operation. The secondary part of transformer T generates the inverted waveform 5C as an inverse of the voltage waveform 5B across the primary part of transformer T. This parabolic waveform is added to the other parabola wave by S-type correction capacitor Cs and is then applied to the deflection coil $L_{DY}$. As a result, the correction is completed in accordance with the required voltage with the correction voltage being the difference between the desired voltage and the existing voltage.

In order to compensate for changes in the correction amount necessary to conform with frequency change detected through the resistor, the deflection S-type correction circuit of present invention detects the DC voltage corresponding to the deflection electromotive force across serially coupled resistors R3 and R6 and the capacitor C3, and then applies the detected voltage occurring at junction J3 to double balanced modulator 10 in proportion gain of double balanced modulation 10.

As mentioned above, according to the present invention, there is provided an efficiency in that it is possible to correct the voltage generated in both terminals of the capacitors connected in series to the horizontal coil of the deflection yoke by changing the generated voltage through the transformer, the double balanced modulator, and the differential amplifier, and by making consecutive corrections based on the change in the deflection frequency.

It will be apparent to those skilled in the art that various modifications and variations can be made in the horizontal deflection S-type correction circuit of the present invention without departing from the spirit or scope of the invention. Thus, it is intended that the present invention cover the modifications and variations of this invention provided they come within the scope of the appended claims and their equivalents.

What is claimed is:

1. A horizontal deflection S-type correction circuit to perform consecutive corrections by changing a voltage generated at both terminals of a capacitor connected in series to horizontal coil of a deflecting yoke, based on a change in deflection frequency in order to correct distortion of an image to be displayed in a monitor, said circuit comprising:

a transformer connected in series to a S-type correction capacitor serially coupled with said horizontal coil;

a resistor for detecting deflecting current, said resistor being coupled with a coil of a first part of said transformer;

a differential amplifier coupled with a coil of a second part of said transformer; and modulator connected between said resistor and said differential amplifier.

2. A circuit as claimed in claim 1, wherein said modulator applies a parabolic wave to a non-inverting input port of said differential amplifier.

3. A circuit as claimed in claim 1, further comprising a diode for clamping a peak pulse generated in said coil of said second part of said transformer so that a voltage during scan is loaded to said differential amplifier, said diode being connected to the other terminal of said coil of said second part of said transformer.

4. A circuit as claimed in claim 1, further comprising a voltage divider dividing a voltage of a junction formed between said horizontal coil of said deflecting yoke and said coil of said first part of said transformer, said voltage divider being coupled to an inverting input port of said differential amplifier.

5. A circuit as claimed in claim 1, wherein impedance of said first part of said transformer has any one value between $$\frac{1}{\sqrt{2}} \sim \frac{1}{2\sqrt{2}}$$

of that of said deflecting yoke.

6. A horizontal deflection circuit, comprising:

a transformer having a primary winding and a secondary winding;

a capacitor having a first electrode connectable at a first junction to one lead of a deflection coil, and a second electrode connected to a first lead of said secondary winding;

a resistor coupled in series between a second and different lead of said secondary winding and a reference potential;

a differential amplifier having an inverting input port connected to said first electrode, and an output port connected to a first lead of said primary winding; and a balanced modulator having two input ports coupled to a second junction between said resistor and said second lead of said secondary winding, and an output port coupled to a non-inverting input port of said differential amplifier.

7. The circuit of claim 6, further comprised of:

a first resistance coupled between said inverting input port and said reference potential;

a second resistance coupled to said inverting input port; and a first capacitance serially coupled between said second resistance and said first junction.

8. The circuit of claim 6, further comprised of:

a first resistance coupled between said first junction and a third junction formed by a second output port of said balanced modulator; and a second resistance coupled between said third junction and said reference potential.

9. The circuit of claim 7, further comprised of:

a third resistance coupled between said first junction and a third junction formed by a second output port of said balanced modulator; and a fourth resistance coupled between said third junction and said reference potential.

10. The circuit of claim 6, further comprised of:

a first resistance coupled between said first junction and a third junction formed by a second output port of said balanced modulator;

a second resistance coupled between said third junction and said reference potential;

a first capacitance coupled between said third junction and said reference potential; and a coupling impedance connected to said third junction.

11. The circuit of claim 6, further comprised of:

said secondary winding exhibiting an impedance exhibiting a value between $$\frac{1}{\sqrt{2}} \sim \frac{1}{2\sqrt{2}}$$

of that exhibited by a deflecting yoke containing the deflection coil.

12. The circuit of claim 7, further comprised of:

said secondary winding exhibiting an impedance exhibiting a value between $$\frac{1}{\sqrt{2}} \sim \frac{1}{2\sqrt{2}}$$

of that exhibited by a deflecting yoke containing the deflection coil.

13. The circuit of claim 8, further comprised of said secondary winding exhibiting an impedance exhibiting a value between $$\frac{1}{\sqrt{2}} \sim \frac{1}{2\sqrt{2}}$$

of that exhibited by a deflecting yoke containing the deflection coil.

14. A horizontal deflection circuit, comprising:

a deflection yoke comprising a deflection coil;

a transformer having a primary winding and a secondary winding;

a first capacitor having a first electrode coupled at a first junction to one lead of a deflection coil, and a second electrode connected to a first lead of said secondary winding;

a first resistor coupled in series with said secondary winding and said first capacitor, between a second and different lead of said secondary winding and a reference potential;

a second capacitor having a first electrode coupled to said first junction;

a second resistor coupled in series with said second capacitor between a second electrode of said second capacitor and a second junction;

a third resistor coupled in series with said second resistor between said second junction and said reference potential;

a fourth resistor coupled between said first junction and a third junction;

a fifth resistor coupled in series with said fourth resistor between said third junction and said reference potential;

a modulator having one input port operationally coupled to said third junction, two input ports coupled to a fourth junction between said first resistor and said second lead, and an output port providing a signal exhibiting a second potential varying in dependence upon potentials occurring at said third junction and said fourth junction; and a differential amplifier providing at an output port coupled to a first lead of said primary winding, a correction potential varying in dependence upon differences between said third potential and a fourth potential occuring at said third junction.

15. The circuit of claim 14, further comprised of a diode coupled between a second lead of said first lead and said reference potential.

16. The circuit of claim 14, further comprised of said secondary winding exhibiting an impedance exhibiting a value between $$\frac{1}{\sqrt{2}} \sim \frac{1}{2\sqrt{2}}$$

of that exhibited by said deflecting yoke.

17. The circuit of claim 15, further comprised of said secondary winding exhibiting an impedance exhibiting a value between $$\frac{1}{\sqrt{2}} \sim \frac{1}{2\sqrt{2}}$$

of that exhibited by said deflecting yoke.

18. A horizontal deflection S-type correction circuit, comprising:

a deflection yoke having a horizontal coil;

a transformer comprising a primary winding and a secondary winding;

a correction capacitor coupled in series between said horizontal coil and a first lead of said secondary winding;

a ground resistance coupled between a second lead of said secondary winding and a reference potential;

a differential amplifier having an output port coupled to a first lead of said primary winding; and a modulator connected between a single input port of said differential amplifier and a first junction formed between said resistance and said second lead of said secondary winding.

19. The circuit of claim 18, further comprising:

a second resistor coupled to a second junction formed between said horizontal coil and said correction capacitor;

a third resistor coupled between said second resistor and said reference potential; and said differential amplifier having a second input port coupled to a third junction formed between said second resistor and said third resistor.

20. The circuit of claim 18, further comprising:

said single input port comprised of an non-inverting port;

a second resistor coupled to a second junction formed between said horizontal coil and said correction capacitor;

a third resistor coupled between said second resistor and said reference potential; and said differential amplifier having an inverting input port coupled to a third junction formed between said second resistor and said third resistor.

21. The circuit of claim 18, further comprising:

a second resistor coupled to a second junction formed between said horizontal coil and said correction capacitor;

a third resistor coupled between said second resistor and said reference potential;

said differential amplifier having a second input port coupled to a third junction formed between said second resistor and said third resistor; and said modulator comprising a double balanced modulator having two input ports coupled to said first junction.

22. The circuit of claim 18, further comprising:

said single input port comprised of an non-inverting port;

a second resistor coupled to a second junction formed between said horizontal coil and said correction capacitor;

a third resistor coupled between said second resistor and said reference potential;

said differential amplifier having an inverting input port coupled to a third junction formed between said second resistor and said third resistor; and said modulator comprising a double balanced modulator having two input ports coupled to said first junction.

23. The circuit of claim 18, further comprising:

a diode coupled between a second lead of said primary winding and said reference potential.

24. The circuit of claim 18, further comprising:

a second resistor coupled to a second junction formed between said horizontal coil and said correction capacitor;

a third resistor coupled between said second resistor and said reference potential;

a diode coupled between a second lead of said primary winding and said reference potential;

said differential amplifier having a second input port coupled to a third junction formed between said second resistor and said third resistor; and said modulator comprising a double balanced modulator having two input ports coupled to said first junction.

25. The circuit of claim 18, further comprising:

said single input port comprised of an non-inverting port;

a second resistor coupled to a second junction formed between said horizontal coil and said correction capacitor;

a third resistor coupled between said second resistor and said reference potential;

a diode coupled between a second lead of said primary winding and said reference potential;

said differential amplifier having an inverting input port coupled to a third junction formed between said second resistor and said third resistor; and said modulator comprising a double balanced modulator having two input ports coupled to said first junction.

\* \* \* \* \*